(12) United States Patent
Matsumi et al.

(10) Patent No.: US 6,265,087 B1
(45) Date of Patent: Jul. 24, 2001

(54) JOINING STRUCTURE AND METHOD OF VEHICLE PANEL SHEETS

(75) Inventors: Yutaka Matsumi; Masaru Suzuki, both of Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/447,388

(22) Filed: Nov. 23, 1999

(30) Foreign Application Priority Data

Nov. 27, 1998 (JP) .................................................. 10-337482

(51) Int. Cl.⁷ .............................. B32B 15/00; B23P 25/00
(52) U.S. Cl. ........................ 428/659; 29/458; 29/527.2; 427/433; 427/436; 428/628; 428/678; 428/679; 428/680; 428/682
(58) Field of Search ................................... 428/659, 628, 428/678, 679, 680, 682; 427/433, 436; 29/458, 527.2

(56) References Cited

U.S. PATENT DOCUMENTS

| | | | |
|---|---|---|---|
| 4,629,659 | 12/1986 | Kyono et al. | 428/659 |
| 4,663,245 | * 5/1987 | Yoshida et al. | 428/659 |

FOREIGN PATENT DOCUMENTS

| | | | |
|---|---|---|---|
| 58-67885 | 4/1983 | (JP) | C25D/5/10 |
| 60-177187 | 9/1985 | (JP) | C23C/22/07 |
| 2-50976 | 2/1990 | (JP) | C23C/22/60 |
| 2-146156 | 12/1990 | (JP) | C23C/28/02 |

* cited by examiner

*Primary Examiner*—Deborah Jones
*Assistant Examiner*—Robert R. Koehler
(74) *Attorney, Agent, or Firm*—McCormick, Paulding & Huber LLP

(57) ABSTRACT

An inexpensive panel member for an automobile body. Two layers of Zn plating (2a, 2b) are formed over two opposite surfaces of a steel plate (1) respectively. Then, another layer of plating (3) is formed over at least one of the two layers of Zn plating. This another layer of plating (3) is made from a metal or alloy having a standard electrode potential equal to or more than Fe. In this manner, a plated steel panel sheet (4) is prepared. Subsequently, a non-plated steel panel sheet (5) is joined with the plated steel panel sheet (4) in a partly overlapping manner such that the another layer of plating (3) contacts the non-plated steel panel sheet (5). The another layer of plating is made from Ni, Ni alloy, Fe—P alloy, Co, or Co alloy. A chemical conversion coating (Phosphophyllite) (8) and common painting layers (97, 98, 99) are further formed over the joined sheets when used for an automobile body.

4 Claims, 9 Drawing Sheets

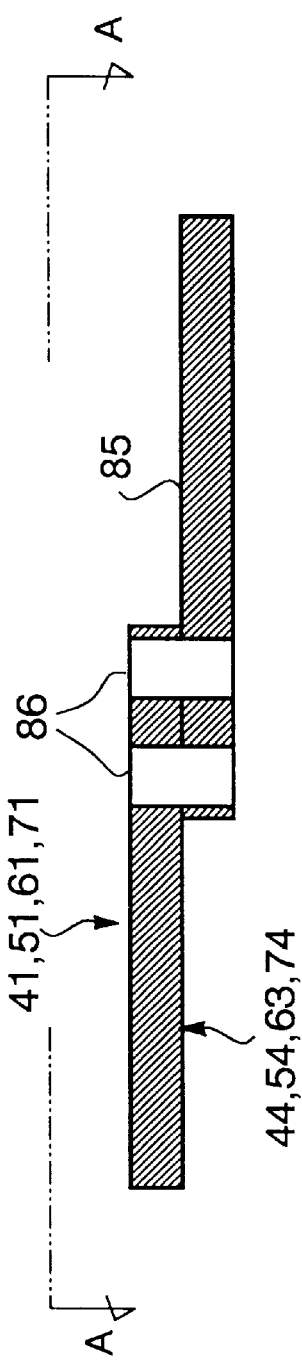
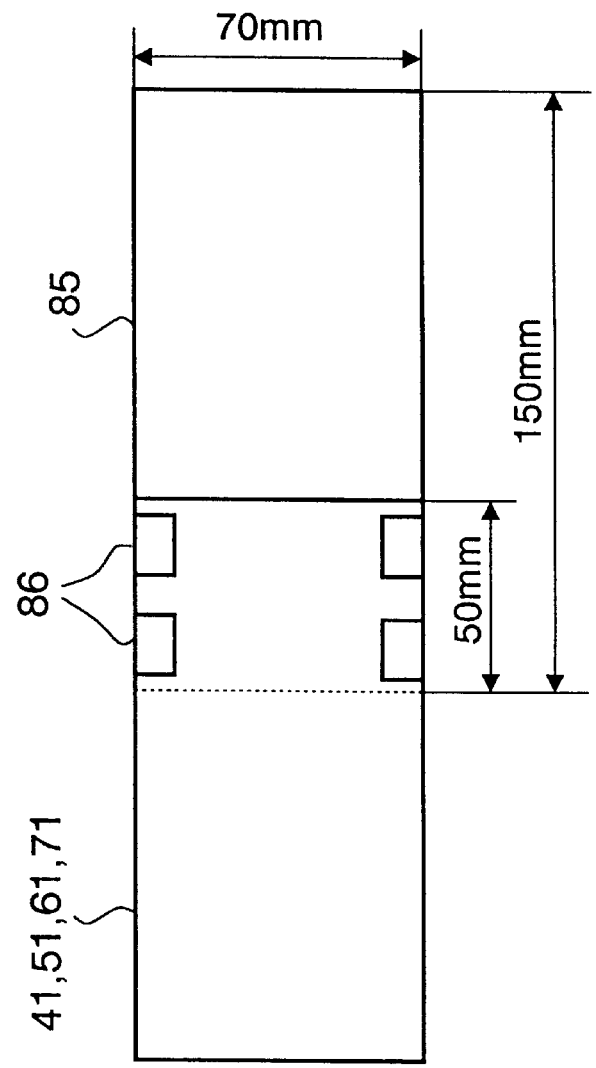
FIG. 8A
FIG. 8B

JOINING STRUCTURE AND METHOD OF VEHICLE PANEL SHEETS

BACKGROUND OF THE INVENTION

1. Field of the Invention

The present invention generally relates to a structure and method for joining panel sheets, and more particularly to such structure and method for joining Zn-plated steel panel sheets with non-plated steel panel sheets.

2. Description of the Related Art

Conventionally, at least one surface (outer surface) of a steel plate (base member or material) is plated with Zn or its alloy in order to prevent corrosion and maintain decent appearance when the steel plate is used as a panel sheet for an automobile body. A common Zn-plated steel panel sheet for an automobile is manufactured by hot or cold rolling a steel plate, and electroplating or hot dipping the steel plate to form a Zn or Zn-alloy plating (collectively referred to as "Zn plating") over a surface of the steel plate.

Referring to FIG. 9A of the accompanying drawings, illustrated is one example of automobile panel sheet 91a that incorporates a steel plate coated with Zn plating. The base member (steel plate) is first plated with Zn or its alloy 95 to provide a Zn-plated steel panel sheet (corrosion-proof steel plate) 94. The steel plate 94 is then subjected to chemical conversion coating treatment with phosphate liquid to create a chemical conversion coating (Hopeite) 96 over the Zn coating. On the phosphate coating 96, a first coating or undercoating 97 is formed by electrodeposition to provide an inner plate 92a. An intermediate coat 98 is further formed over the undercoat 97, and a finish coat 99 is then formed over the intermediate coat 98 to provide an outer plate 93a. This outer plate 93a is the panel sheet 91a. It should be noted that the steel plate 94 has the Zn coating 95 on both surfaces, but only one surface is illustrated.

Referring to FIG. 9B of the accompanying drawings, illustrated is another example of automobile panel sheet 91b that contains a steel plate without Zn plating. A non-plated steel panel sheet 102 is first coated with a chemical conversion coat (Phosphophyllite) 103 by phosphate liquid. Then, an undercoat 97 is applied over the phosphate crystal coat 103 by electrodeposition to provide an inner plate 92b. An outer plate 93b is obtained by further coating the inner plate 92b with an intermediate coat 98 and finish coat 99. The outer plate 93b is the panel member 91b.

It should be noted that an appropriate kind of intermediate coat 98 is selected according to, for example, the type of the automobile. Therefore, it should also be noted that the intermediate coat 98 may be dispensed with if unnecessary.

In general, an automobile panel member is made from a plurality of panel sheets. If an entire panel member of an automobile body is made from a plurality of Zn-plated steel panel sheets 94 only, a cost is raised considerably. Therefore, as illustrated in FIG. 8A of the accompanying drawings, the expensive Zn-plated steel panel sheet is connected to the inexpensive non-plated steel panel sheet in a partly overlapping manner such that the Zn-plated steel panel sheet is located at an area of the body which requires high resistance to corrosion. FIG. 10 of the accompanying drawings illustrates an overlapping portion of the two sheets in an enlarged scale.

Referring now to FIGS. 11A and 11B of the accompanying drawings, a chemical conversion coating (Hopeite) 96 is formed over the surface of a Zn plating 95a by phosphoric acid etching, and another chemical conversion coating (Phosphophyllite) 103 is formed over the surface of the non-plated steel panel sheet 102 ("Normal Area" in FIG. 10) by phosphoric acid etching. Anode and cathode exist microscopically (they are present very closely), and therefore an anode reaction (phosphoric acid etching) and a cathode reaction (generation of chemical conversion crystal around the etched area) take place on the same steel plate. As a result, the crystal precipitates and grows to extend over the anode-etched surface which is fresh and reactive (zones designated at 101 in FIG. 10). Thus, the Zn plating 95a and chemical conversion coating (Hopeite) 96 are firmly joined with each other, and the non-plated steel panel sheet 102 and chemical conversion coating (Phosphophyllite) 103 are also firmly joined with each other.

As depicted in FIG. 10, however, the panel member always has at least one connection of the Zn-plated steel panel sheet 94 and non-plated steel panel sheet 102. In the vicinity of the connection, a voltage difference is produced due to contact of different metals when dipped in the chemical conversion treatment liquid.

Referring to FIGS. 12A and 12B, consequently, Zn (base metal) becomes an anode in the surface of the non-plated steel panel sheet 102 near the two-sheet connection on the connection side ("Weak Adhesion Area" in FIG. 10). Therefore, Zn is only dissolved by the anode reaction, and crystal precipitates and grows on the non-etched steel surface. In other words, although a chemical conversion crystal is formed on the Fe-based steel plate in the range of about 20 mm from the two-sheet connection, it is not the chemical conversion coating (Phophphyllite) 103 but the chemical conversion coating (Hopeite) 96 having no Fe.

The chemical conversion coating (Hopeite) 96 is difficult to adhere onto the non-plated steel panel sheet 102 and easy to exfoliate. Therefore, connection of the Zn-plated steel panel sheet 94 and non-plated steel panel sheet 102 (different metal connection) is not applicable to those areas of a vehicle body panel which are subjected to an external stress. Such areas of the vehicle body are, for example:

(1) Front and roof panels of a vehicle body, which often experience pitching movements;
(2) Panels near vehicle doors, which frequently experience vibrations and frictions due to opening and closing;
(3) Panels of which two-sheet connection is often exposed to water or moisture due to an inherent structure of the vehicle (areas where edge corrosion tends to occur);
(4) Panels which a service man's legs, hands and body tend to touch or hit; and
(5) Panels onto which optional parts such as ski carriers are mounted.

Therefore, even if the non-plated steel panel sheet 102 itself possesses a corrosion resistance required by the vehicle body, it cannot be used for those areas such as mentioned above. Instead, the expensive Zn-plated steel panel sheets 94 should be used. The Zn-plated steel panel sheets are joined with each other to provide a panel member for such areas because the same metal connection does not produce a voltage difference in the chemical conversion treatment. Accordingly, a Zn-plated steel panel sheet utilization ratio is high in the conventional body panel.

SUMMARY OF THE INVENTION

An object of the present invention is to eliminate the above-described problems of the conventional auto body panel.

According to one aspect of the present invention, there is provided a panel member including a steel plate, two layers of Zn plating formed over two opposite surfaces of the steel plate respectively, another layer of plating formed over at least one of the two layers of Zn plating, so as to form a plated steel panel sheet, and a non-plated steel panel sheet joined with the plated steel panel sheet in a partly overlapping manner such that the another layer of plating contacts the non-plated steel panel sheet. The another layer of plating is made from a metal or alloy having a standard electrode potential equal to or more than Fe. Since the connection between the plated steel panel sheet and non-plated steel panel sheet is connection of the metal (or alloy) plating and Fe, the connection of the plated and non-plated steel panel sheets is less influenced by the voltage difference caused in the chemical conversion treatment bath due to different metal connection. As a result, a chemical conversion coating (Phosphophyllite) is formed at an area near the two-sheet connection ("Weak Adhesion Area" in FIG. 10). Unlike the conventional structure, a chemical conversion coating (Hopeite) is not created there.

Preferably, the another layer of plating is made from Ni, Ni alloy, Fe—P alloy, Co, or Co alloy.

According to another aspect of the present invention, there is provided a method of joining panel sheets including the step of providing a steel plate, the step of forming two layers of Zn plating over two opposite surfaces of the steel plate respectively, the step of forming another layer of plating over at least one of the two layers of Zn plating, thereby providing a plated steel panel sheet, and the step of joining a non-plated steel panel sheet with the plated steel panel sheet in a partly overlapping manner such that the another layer of plating is in contact with the non-plated steel panel sheet. The another layer of plating is made from a metal or alloy having a standard electrode potential equal to or more than Fe.

BRIEF DESCRIPTION OF THE DRAWINGS

FIG. 8A schematically depicts, in cross sectional view, connection between the Zn-plated steel panel sheet and non-plated steel panel sheet in Examples 1, 2 and Comparisons 1, 2;

FIG. 8B is an illustration of the joined two panel sheets shown in FIG. 8A when viewed in the direction indicated by the arrows A in FIG. 8A;

DETAILED DESCRIPTION OF THE INVENTION

Now, embodiments of the present invention will be described in reference to the accompanying drawings.

Figure 1:
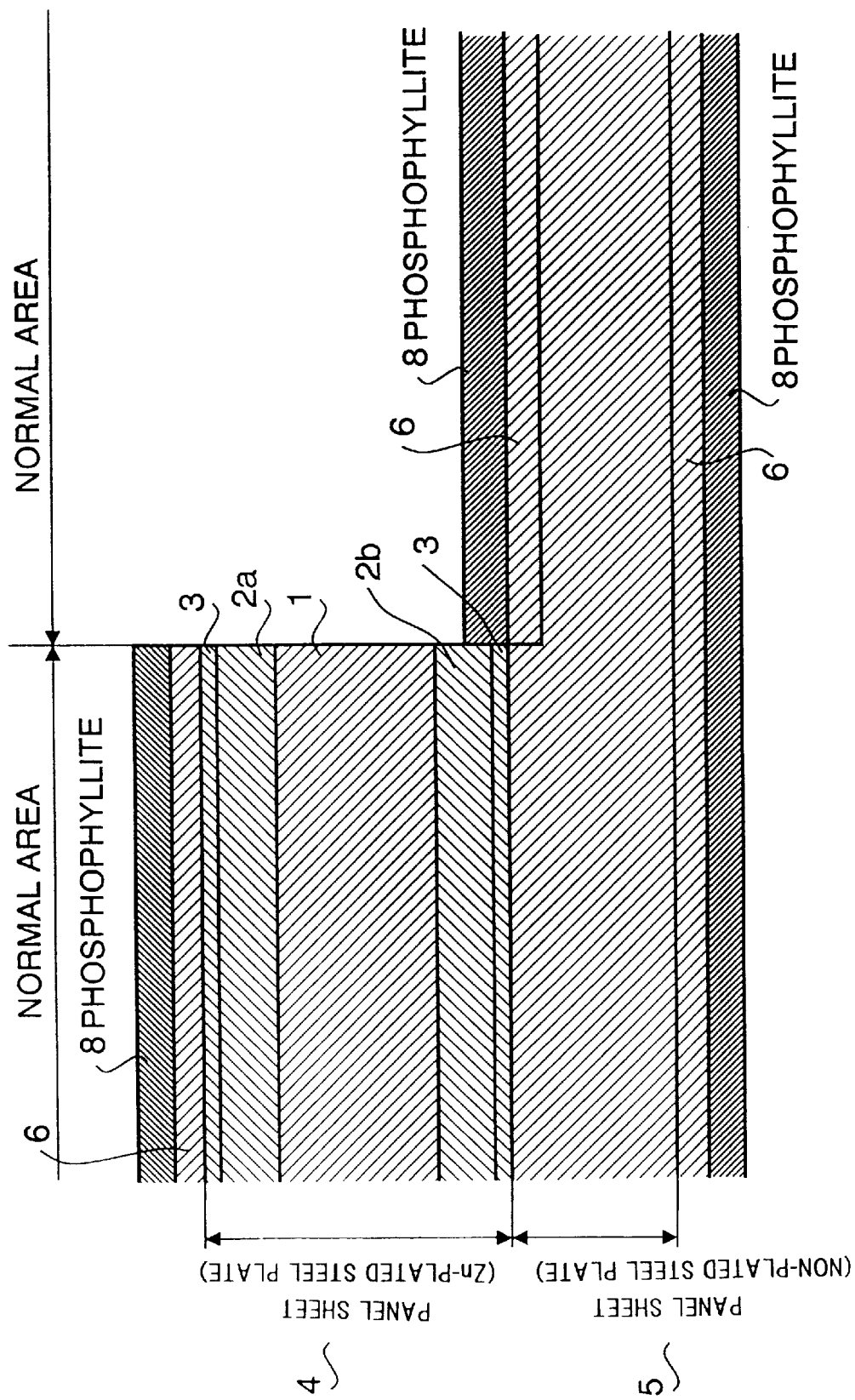
FIG. 1 illustrates a transversal cross sectional view of a panel member for an automobile according to the present invention.

Referring to FIG. 1, illustrated is an automobile panel member in cross section. This panel includes a Zn-plated steel panel sheet 4 and a non-plated steel panel sheet 5 connected to the panel sheet 4 in a partly overlapping manner as shown in FIG. 8A. The Zn-plated steel panel sheet 4 includes a base steel plate 1, Zn-plating layers 2a, 2b formed on both surfaces of the steel plate 1, and another plating layers 3, 3 formed over the Zn-plating layers 2a, 2b. The latter layers of plating 3 are coating of metal or alloy having a standard electrode potential equal to or more than Fe, and simply referred to as metal plating below.

Preferably, the metal plating 3 is made from Ni, Fe—P or Co if cost reduction and general use are expected. A chemical conversion coating (Hopeite) is formed by applying a chemical conversion treatment to the surface of the metal plating 3 containing Ni or Co. On the other hand, another chemical conversion coating (Phosphophyllite) 8 is formed if the surface of the metal plating 3 containing Fe—P is subjected to the chemical conversion treatment.

Figure 9A:
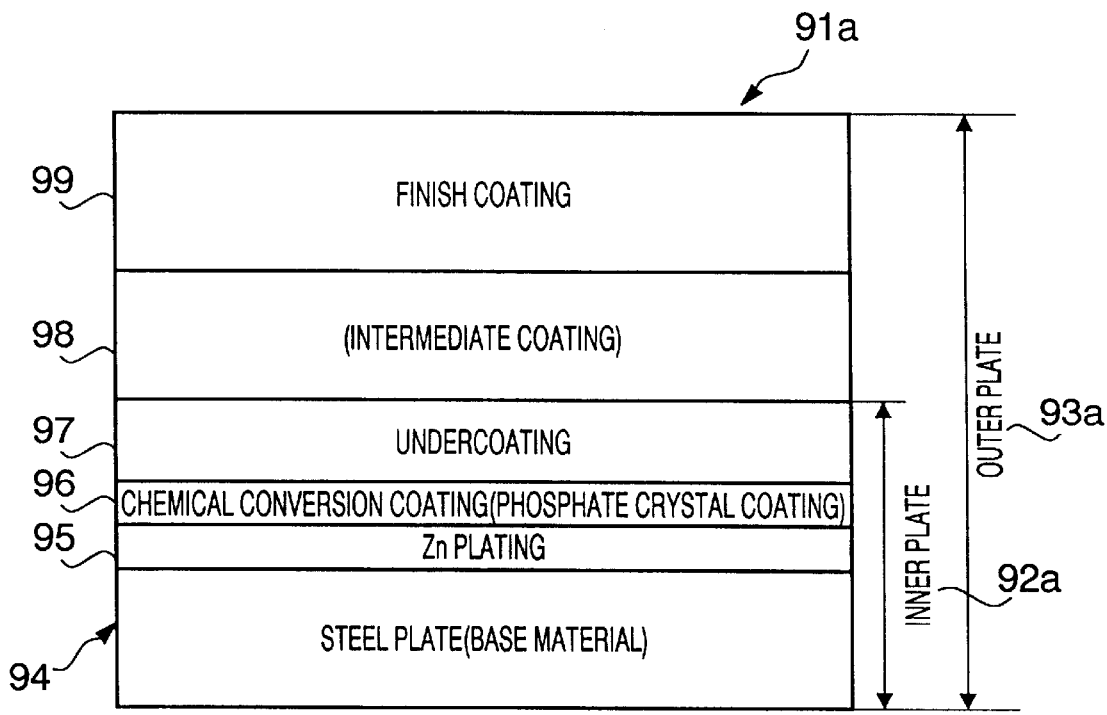
FIG. 9A diagrammatically illustrates a transversal cross sectional view of an automobile body panel that has, as a base material, a steel plate coated with Zn plating.
Figure 9B:
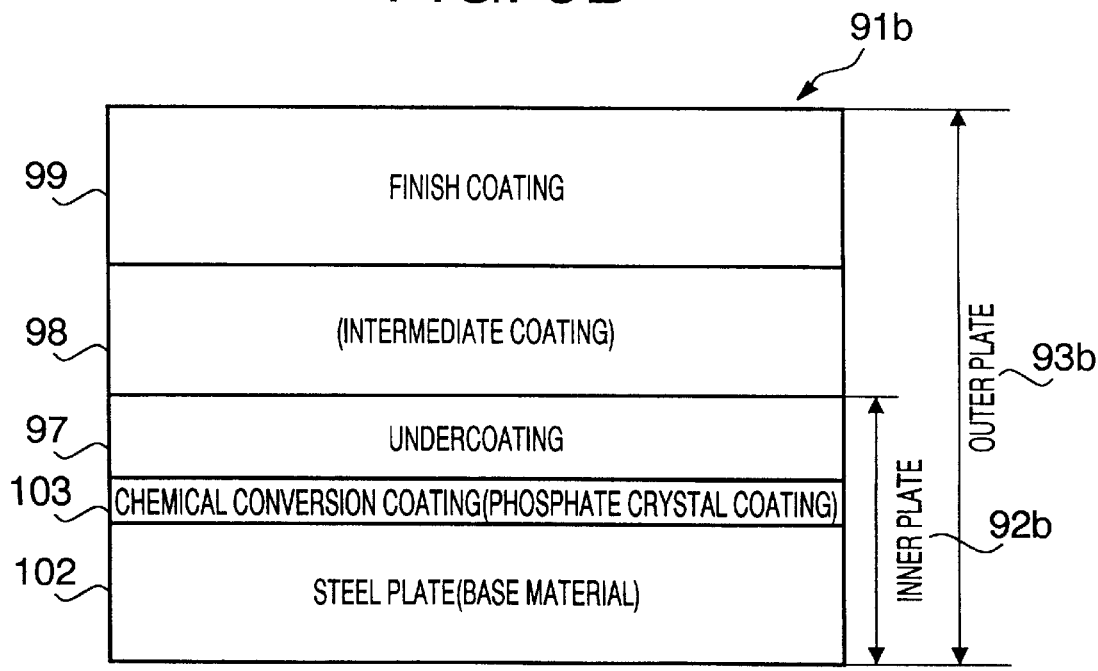
FIG. 9B diagrammatically illustrates a transversal cross sectional view of an automobile body panel that has a steel plate without Zn plating.
Figure 10:
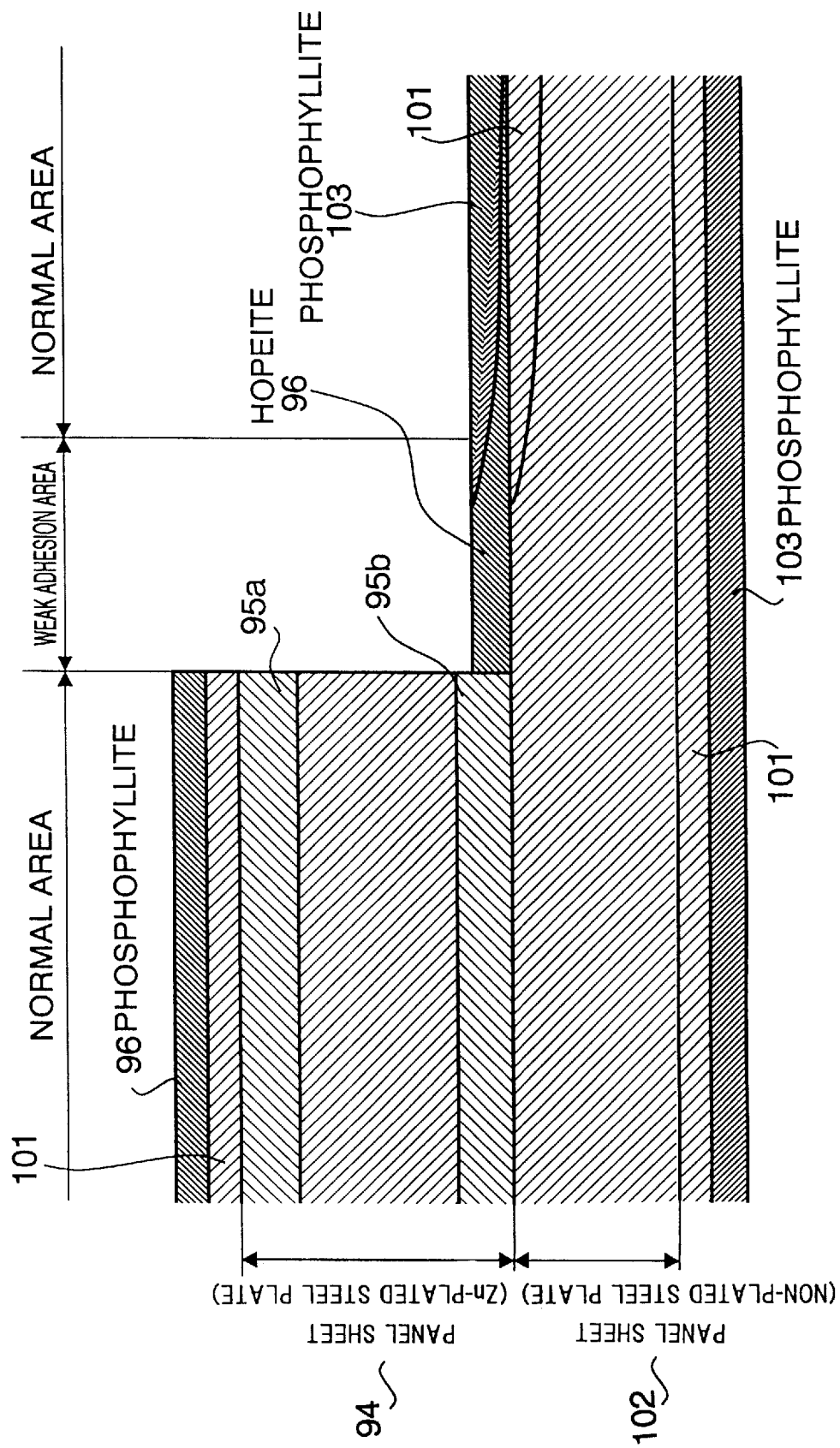
FIG. 10 illustrates a transversal cross sectional view of an automobile body panel according to a conventional structure.
Figure 11A:
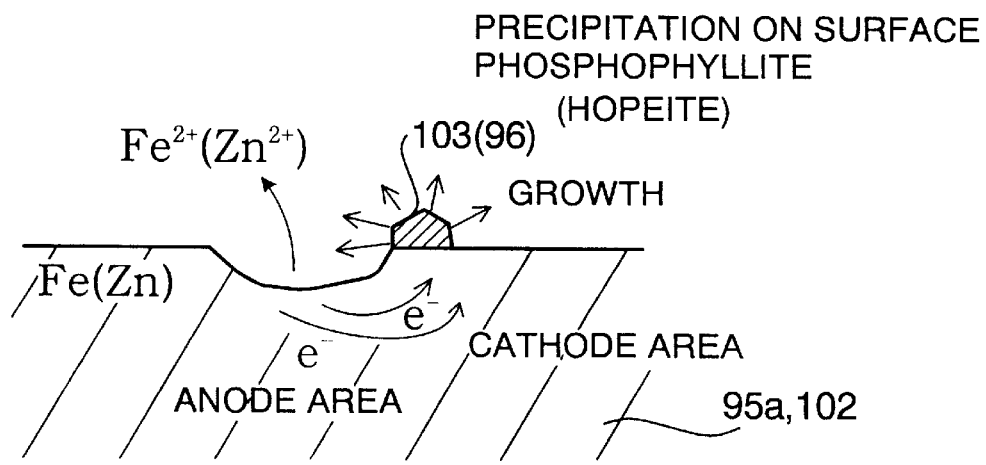
FIG. 11A diagrammatically illustrates a surface reaction at the beginning that takes place in normal connection areas on steel plates in FIG. 10.
Figure 11B:
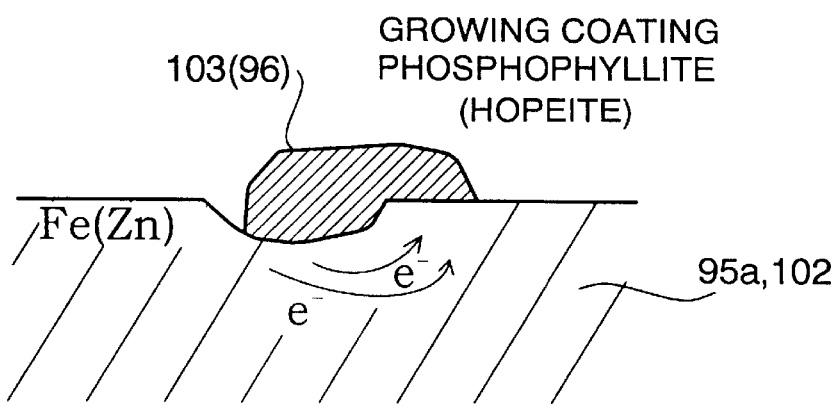
FIG. 11B is similar to FIG. 11A, illustrating the same reaction in progress.
Figure 12A:
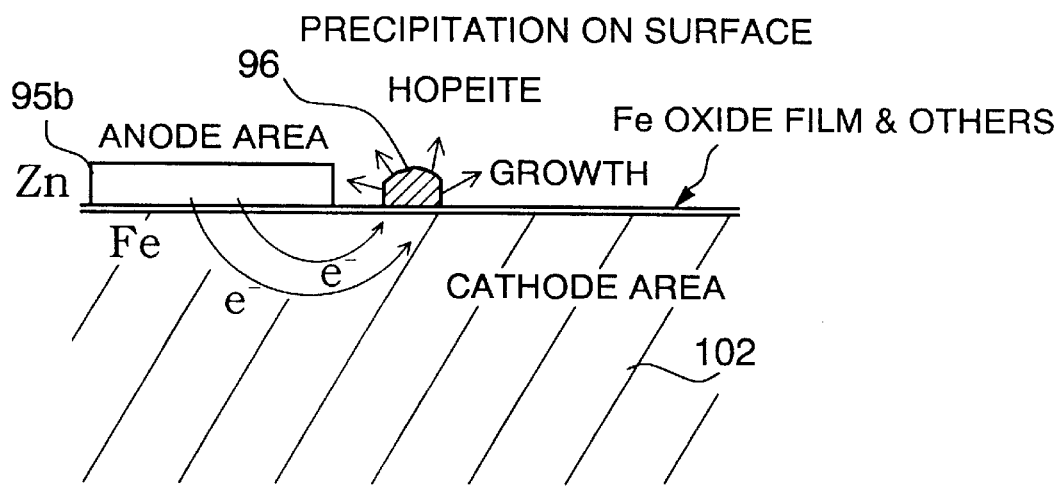
FIG. 12A illustrates another surface reaction occurring in the area of weak adhesion on the non-plated steel panel sheet shown in FIG. 10.
Figure 12B:
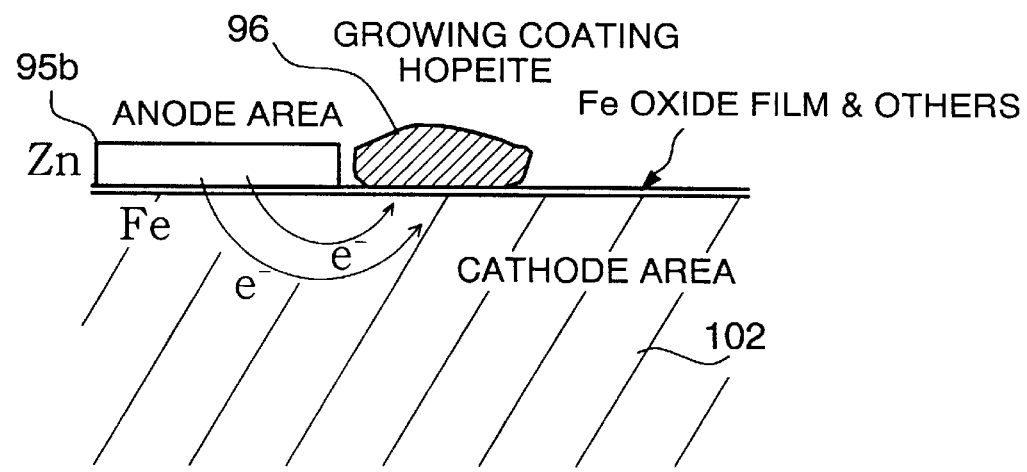
FIG. 12B is similar to FIG. 12A, illustrating the same reaction in progress.

In the illustrated embodiment, the metal plating 3 contains Fe—P. The Zn-plated steel panel sheet 4 and non-plated steel panel sheet 5 are connected and subjected to the chemical conversion treatment. The chemical conversion coating 8 is created on that surface 6 of the metal plating 3 which is etched by chemical conversion treatment liquid. Although not illustrated, two or three painting layers (undercoating, intermediate coating and finish coating) as those shown in FIGS. 9A, 9B may also be applied over the chemical coating 8.

An amount of plating in the layer 3 is equal to or more than 0.25 g/m$^2$ if the layer 3 is used at a position less influenced by external stress. However, if the steel plate 1 is utilized at a position exposed to the external stress, then its amount is preferably raised to or more than 0.70 g/m$^2$. The upper limit of the amount of coating is preferably 1.5 g/m$^2$ in the case of Ni or Co metal plating 3 because too much plating will prevent the chemical conversion treatment liquid from contacting the Zn-plated layers 2a, 2b, which would disable the etching. The amount of plating may not be limited in the case of Fe—P metal plating 3.

It should be noted that the metal plating layers 3 are not necessarily formed over both of the Zn plating layers 2a, 2b. For instance, the metal plating 3 may be provided on the Zn plating 2b only, and the metal plating 3 associated with the Zn plating 2b may be connected to the non-plated steel panel sheet 5.

The following reactions occur when the Zn-plated steel panel sheet 4 is overlapped the non-plated steel panel sheet 5 and undergoes the chemical conversion treatment with the phosphate treatment liquid (chemical conversion treatment liquid).

Figure 2:
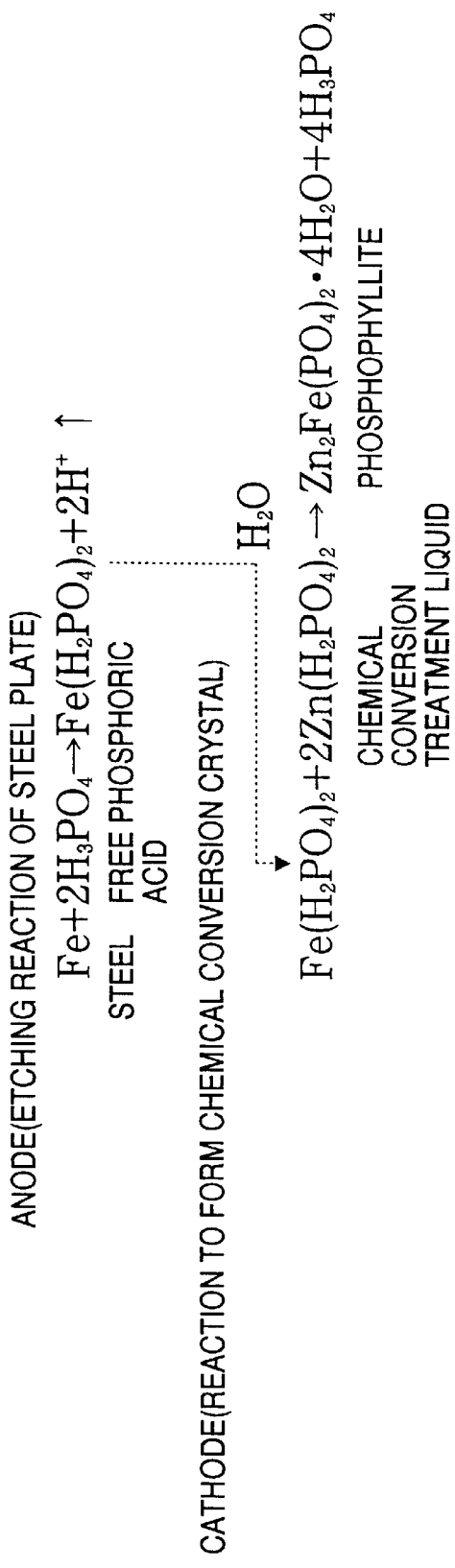
FIG. 2 illustrates reactions in a chemical conversion treatment, that take place on a surface of a non-plated steel plate (panel sheet)

Referring to FIG. 2, a chemical conversion reaction that takes place at the non-plated steel panel sheet 5 is an anode reaction in which ionized Fe reacts with free phosphoric acid of the chemical conversion treatment liquid, thereby generating $Fe(H_2PO_4)_2$. Then, $Fe(H_2PO_4)_2$ reacts with the chemical conversion treatment liquid. This is a cathode reaction and precipitates phosphate crystal: $Zn_2Fe(PO_4)_2 \cdot 4H_2O$ (Phosphophyllite) which grows over the non-plated steel panel sheet 5.

Figure 3:
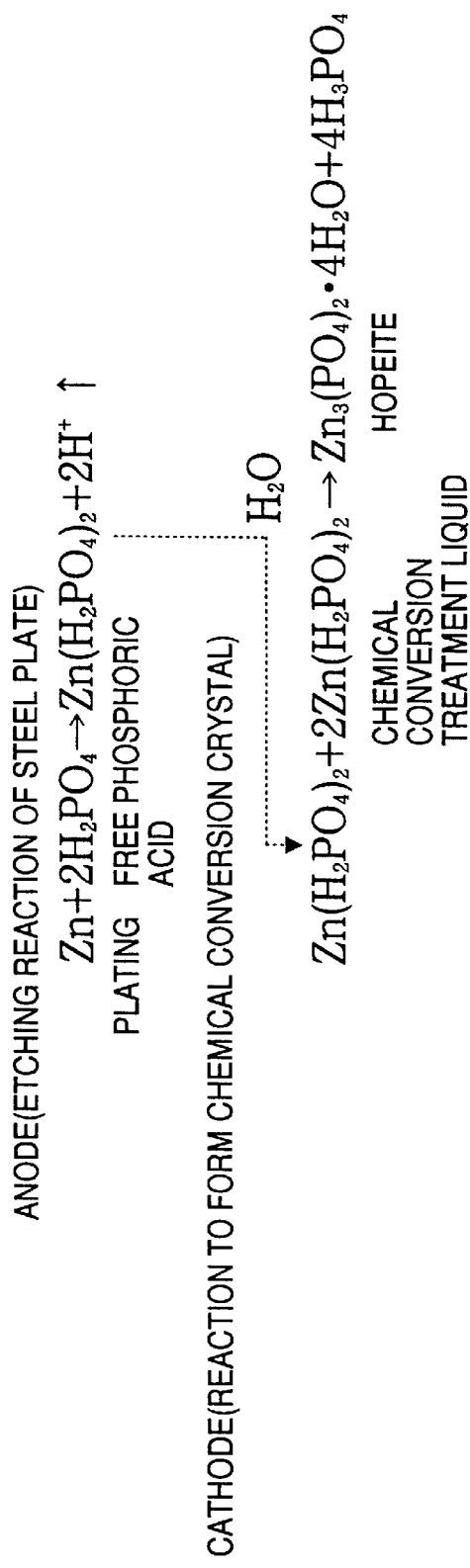
FIG. 3 also illustrates reactions in a chemical conversion treatment, that take place on a surface of a Zn-plated steel plate (panel sheet)

Referring to FIG. 3, a chemical conversion reaction at the Zn-plated steel panel sheet 4 is an anode reaction; ionized Zn reacts with the free phosphoric acid of the chemical conversion treatment liquid. This results in generation of $Zn(H_2PO_4)_2$. Subsequently, a cathode reaction takes place; $Zn(H_2PO_4)_2$ reacts with the chemical conversion treatment liquid. This reaction causes a phosphate crystal, namely $Zn_3(PO_4)_2 \cdot 4H_2O$ (Hopeite), to precipitate and grow over the Zn-plated steel panel sheet 4.

At this point, the connection between the Zn-plated steel panel sheet 4 and non-plated steel panel sheet 5 is contact of the metal plating 3 and Fe because that surface of the Zn-plated steel panel sheet 4 which is connected to the non-plated steel panel sheet 5 is formed by the metal plating 3 that is made from metal or alloy which has a standard electrode potential not less than Fe and which has little potential difference from the Fe standard electrode potential.

By having the metal plating 3 on the connection surface of the Zn-plated steel panel sheet 4, no potential difference occurs due to different metal connection (Fe—Zn connection) in the chemical conversion treatment liquid. Therefore, Zn (Zn plating 2b) of the Zn-plated steel panel sheet 4 is not etched. In other words, the anode and cathode microscopically exist on the surface of the non-plated steel panel sheet 5, and both the anode reaction and the cathode reaction take place on the same steel panel sheet. Because of this, the chemical conversion coating (Hopeite) 8 is not produced on the connection surface of the non-plated steel panel sheet 5 in the vicinity of the border (connection edge) of the plated steel panel sheet 4 and non-plated steel panel sheet 5. Instead, crystal of another chemical conversion coating (Phosphophyllite) 8 precipitates and grows on the whole surface of the Zn-plated steel panel sheet 4 and non-plated steel panel sheet 5 except for the two-sheet overlapping portion. In other words, this chemical conversion coating 8 extends over a fresh and reactive surface that is etched with the anode. Since the chemical conversion coating 8 is firmly secured on the non-plated steel panel sheet 5, it does not exfoliate from the non-plated steel panel sheet 5.

Since the chemical conversion coating (Phosphophyllite) 8 and non-plated steel panel sheet 5 are firmly joined to each other, it is now possible to use the inexpensive non-plated steel panel sheet 5 for a panel member at a position subjected to an external stress such as the positions (1) to (5) described earlier. It should be remembered that the non-plated steel panel sheet 5 cannot be utilized at such areas in a conventional structure.

Use of the non-plated steel panel sheet 5 at the areas of the panel member exposed to the external stress contributes to cost reduction since the expensive Zn-plated steel panel sheets 4 are only located at those areas which require high corrosion resistance.

EXAMPLE 1

Figure 4:
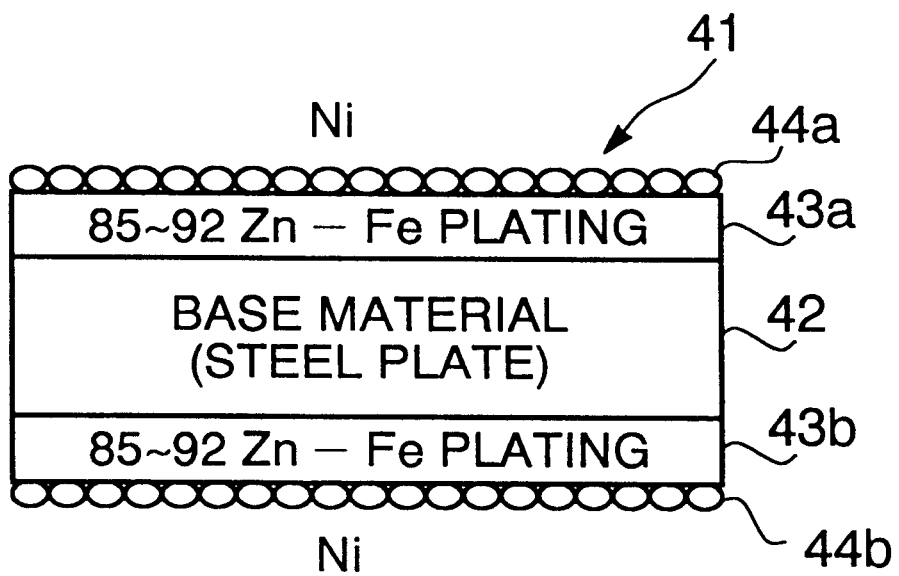
FIG. 4 diagrammatically illustrates a transversal cross sectional view of a Zn-plated steel panel sheet in Example 1 according to the present invention.

Referring to FIG. 4, nine kinds of Zn-plated steel panel sheets 41 (available from NKK Corporation of Tokyo, Japan) were prepared. These nine specimens are collectively referred to as Example 1, or individually referred to as Examples 1.1 to 1.9. Each of the steel panel sheets 41 included a base steel plate 42 having a length of 150 mm, a width of 70 mm, and a thickness of 0.9 mm. It also had Zn-plated coating (85 to 92 wt % Zn—Fe plating) 43a, 43b with the plating rate or density of 45 g/m$^2$ and layer thickness of 5.7 μm, and Ni plating 44a, 44b with the plating rate of 0.12 to 1.10 g/m$^2$ and layer thickness of 132 to 1210 angstrom. The Zn plating 43a, 43b covered the base steel plate 42, and the Ni plating 44a, 44b covered the Zn plating as illustrated.

Referring now to FIGS. 8A and 8B, the Zn-plated steel panel sheet 41 was connected to a non-plated steel panel sheet (available from Nippon Steel Corporation of Tokyo Japan) 85 having a length of 150 mm, a width of 70 mm and a thickness of 0.9 mm in a partly overlapping manner. In this example, the two panel sheets 41 and 85 overlapped 50 mm. A metallic clip 86 clamped the overlapping portion when each specimen was prepared.

EXAMPLE 2

Figure 5:
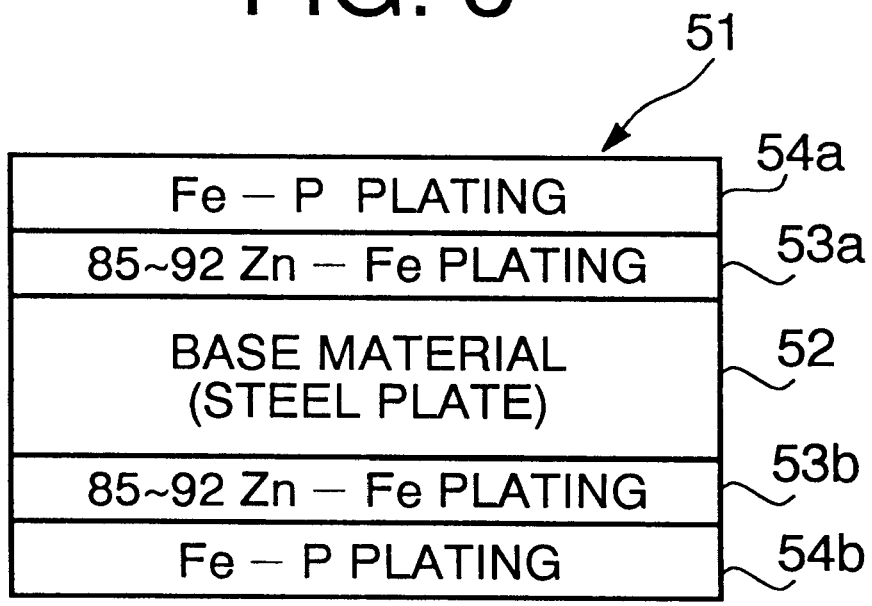
FIG. 5 illustrates a transversal cross sectional view of a Zn-plated steel panel sheet in Example 2 of the present invention.

Referring to FIG. 5, prepared was another Zn-plated steel panel sheet (available from Kawasaki Steel Corporation of Tokyo, Japan) 51 which included a base steel plate 52 having a length of 150 mm, a width of 70 mm and a thickness of 0.9 mm. It also had Zn-plating (85 to 92 wt % Zn—Fe plating) 53a, 53b with the plating rate of 45 g/m$^2$ and a coating thickness of 5.7 μm, and Fe—P plating (P: 0.5 to 15 wt %) 54a, 54b with the plating rate of 2.60 g/m$^2$ and a coating thickness of 2600 angstrom.

A specimen was prepared as in Example 1 except for the above-described Zn-plated steel panel sheet 51.

COMPARISON 1

Figure 6:
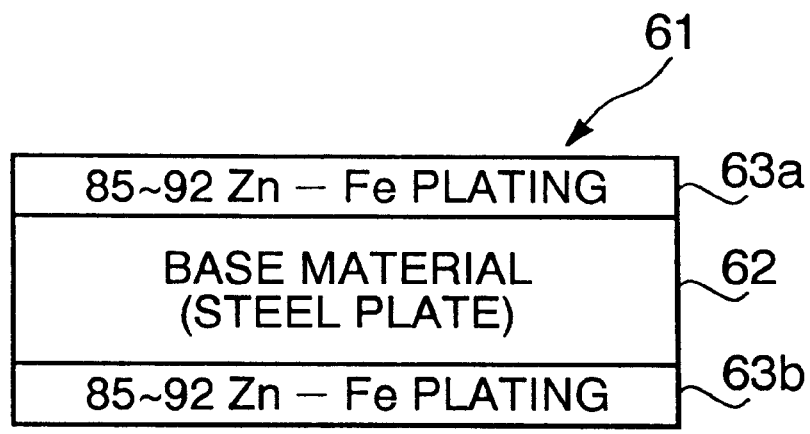
FIG. 6 illustrates a transversal cross sectional view of a Zn-plated steel panel sheet in Comparison 1 according to the conventional structure.

Referring to FIG. 6, prepared was still another Zn-plated steel panel sheet (available from NKK Corporation) 61 which included a base steel plate 62 having a length of 150 mm, a width of 70 mm and a thickness of 0.9 mm, and Zn-plating (85 to 92 wt % Zn—Fe plating) 63a, 63b with the plating rate of 45 g/m$^2$ and a coating thickness of 5.7 μm.

A specimen was prepared as in Example 1 except for the above-described Zn-plated steel panel sheet 61.

COMPARISON 2

Figure 7:
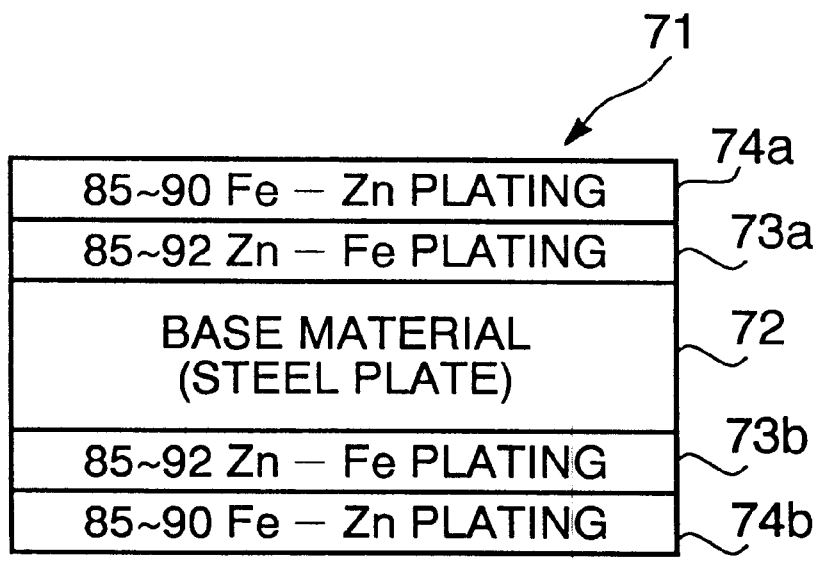
FIG. 7 illustrates a transversal cross sectional view of a Zn-plated steel panel sheet in Comparison 2.

Referring to FIG. 7, prepared was yet another Zn-plated steel panel sheet (available from NKK Corporation) 71 which included a base steel plate 72 having a length of 150 mm, a width of 70 mm and a thickness of 0.9 mm, Zn-plating (85 to 92 wt % Zn—Fe plating) 73a, 73b with the plating rate of 45 g/m$^2$ and a coating thickness of 5.7 μm, and Fe plating (85 to 90 wt % Fe—Zn plating) 74a, 74b with the plating rate of 4.00 g/m² and a coating thickness of 4000 angstrom.

A specimen was prepared as in Example 1 except for the above-described Zn-plated steel panel sheet 71.

Fundamental data about the Zn-plated steel panel sheets (specimens) prepared according to Examples 1, 2 and Comparisons 1, 2 are shown in Table I.

TABLE I

| | Zn-Plated Steel Panel Sheet | | | |
|---|---|---|---|---|
| | Layer of Zn Plating | | Layer of Metallic Plating | |
| Examples | Material | Amount of Adh. (g/m²) | Material | Amount of Adh. (g/m²) |
| Example 1.1 | 85–92Zn—Fe | 45 | Ni | 0.12 |
| Example 1.2 | 85–92Zn—Fe | 45 | Ni | 0.25 |
| Example 1.3 | 85–92Zn—Fe | 45 | Ni | 0.31 |
| Example 1.4 | 85–92Zn—Fe | 45 | Ni | 0.42 |
| Example 1.5 | 85–92Zn—Fe | 45 | Ni | 0.48 |
| Example 1.6 | 85–92Zn—Fe | 45 | Ni | 0.54 |
| Example 1.7 | 85–92Zn—Fe | 45 | Ni | 0.77 |
| Example 1.8 | 85–92Zn—Fe | 45 | Ni | 0.85 |
| Example 1.9 | 85–92Zn—Fe | 45 | Ni | 1.10 |
| Example 2 | 85–92Zn—Fe | 45 | Fe—P | 2.60 |
| Comp. 1 | 85–92Zn—Fe | 45 | — | — |
| Comp. 2 | 85–92Zn—Fe | 45 | 80–90Fe—Zn | 4.00 |

The specimens of Examples 1, 2 and Comparisons 1, 2 were dipped into a chemical conversion treatment bath ("PBL-3020" available from Nihon Parkerizing Co., Ltd. of Tokyo, Japan) with a temperature of 40 to 45° C. for 90 seconds to conduct a chemical conversion treatment until the chemical conversion coating rate equal to or more than 2 to 3 g/m² was obtained.

The specimens covered with the chemical conversion coating were then immersed into a painting bath ("IT-11" available from Kansai Paint, Co., Ltd. of Osaka, Japan) with a temperature of 32° C. for 150 seconds to cause electrodeposition until an electrodeposition coating of 16 to 20 μm was obtained.

These specimens underwent a cross-cut adhesion test (JIS K 5400 8.5) and scratch text with a metallic scale to evaluate adhesion quality between the non-plated steel panel sheet and chemical conversion coating in the overlapping area.

Table II shows evaluation results. In this table, O indicates very good adhesion, Δ indicates good adhesion, and X indicates bad adhesion.

TABLE II

| | Exfoliation Width In Cross-Cut Adh. Test | | Exfoliation Width In Scale Scratch Test | | |
|---|---|---|---|---|---|
| Examples | Max Exfol. Width From Joint (mm) | Eval. | Max Exfol. Width From Joint (mm) | Eval. | Total Evaluation |
| Example 1.1 | 2.0 | Δ | 4.5 | X | X |
| Example 1.2 | 0.0 | O | 2.0 | Δ | Δ |
| Example 1.3 | 0.0 | O | 1.5 | Δ | Δ |
| Example 1.4 | 0.0 | O | 1.5 | Δ | Δ |
| Example 1.5 | 0.0 | O | 1.5 | Δ | Δ |
| Example 1.6 | 0.0 | O | 1.5 | Δ | Δ |
| Example 1.7 | 0.0 | O | 0.0 | O | O |
| Example 1.8 | 0.0 | O | 0.0 | O | O |
| Example 1.9 | 0.0 | O | 0.0 | O | O |
| Example 2 | 0.0 | O | 0.0 | O | O |
| Comp. 1 | 3.0 | X | 7.5 | X | X |
| Comp. 2 | 1.0 | Δ | 3.5 | X | X |

As understood from Table II, the specimens of Example 1 had an exfoliation width which decreased as the amount of Ni adhesion in the plating 44a, 44b (FIG. 4) increased. No exfoliation was observed in the cross-cut adhesion test when the amount of Ni adhesion was equal to or more than 0.25 g/m². No exfoliation was observed in the metallic scale scratch test when the amount of Ni adhesion was equal to or more than 0.77 g/m². In Example 2, likewise, since the amount of Fe—P adhesion in the Fe—P plating 54a, 54b (FIG. 5) was 2.60 g/m², there was no exfoliation in the cross-cut adhesion test and metallic scale scratch test.

From these facts, it is revealed that the non-plated steel panel sheet 85 and chemical conversion coating are firmly joined with each other if the amount of adhesion of the metal plating in the metal plating 44a, 44b (or 54a, 54b) formed on the surface of the Zn plating 43a, 43b (or 53a, 53b) is not less than 0.70 g/m².

On the contrary, the specimen of Comparison 1 had a large maximum-exfoliation-width in the cross-cut adhesion test and metallic scale scratch test, i.e., 3.0 mm and 7.5 mm, respectively. This is because the Zn plating 63a, 63b of the Zn-plated steel panel sheet 61 (FIG. 6) directly contacts the non-plated steel panel sheet 85 so that the non-plated steel panel sheet 85 is considerably affected by Zn. More specifically, an area where the adhesion between the non-plated steel panel sheet 85 and chemical conversion coating is weak extends widely.

The specimen of Comparison 2 demonstrated a smaller maximum-exfoliation-width in the cross-cut adhesion test and metallic scale scratch test, i.e., 1.0 mm and 3.5 mm respectively, as compared with Comparison 1.

This is because the plating 74a, 74b of Fe alloy (Fe—Zn alloy) is formed on the surface of the Zn plating 73a, 73b (FIG. 7) so that the Zn concentration or density in the surface of the Zn-plated steel panel sheet 71 is reduced. When compared with Comparison 1, therefore, the non-plated steel panel sheet 85 is less influenced by Zn. However, the influence of Zn is not eliminated completely so that the adhesion between the non-plated steel panel sheet 85 and chemical conversion coating is weak in some areas.

The illustrated and described panel member for a vehicle as well as structure and method for joining panel members are disclosed in Japanese Patent Application No. 10-337482 filed on Nov. 27, 1998, the instant application claims priority of this Japanese Patent Application, and the entire disclosure thereof is incorporated herein by reference.

What is claimed is:

1. A panel sheet joining structure comprising:
    a steel plate having two opposite surfaces;
    two layers of Zn plating formed over the two opposite surfaces of the steel plate respectively;
    another layer of plating formed over at least one of the two layers of Zn plating, the another layer of plating being made from a metal or alloy having a standard electrode potential equal to or more than Fe, thereby forming a plated steel panel sheet; and a non-plated steel panel sheet joined with the plated steel panel sheet, with the another layer of plating being in contact with the non-plated steel panel sheet.

2. The panel sheet joining structure of claim 1, wherein an amount of adhesion of the another plating layer is equal to or more than 0.70 g/m$^2$.

3. A method of joining panel sheets comprising the steps of:

providing a steel plate;

forming two layers of Zn plating over two opposite surfaces of the steel plate respectively;

forming another layer of plating over at least one of the two layers of Zn plating, the another layer of plating being made from a metal or alloy having a standard electrode potential equal to or more than Fe, thereby providing a plated steel panel sheet; and joining a non-plated steel panel sheet with the plated steel panel sheet, with the another layer of plating being in contact with the non-plated steel panel sheet.

4. The method of joining panel sheets according to claim 3, wherein an amount of adhesion of the another alloy plating layer is equal to or more than 0.70 g/m$^2$.

* * * * *